United States Patent
Oprescu-Surcobe et al.

(10) Patent No.: US 9,237,483 B2
(45) Date of Patent: Jan. 12, 2016

(54) METHODS FOR MANAGING RESOURCE UTILIZATION IN A LONG TERM EVOLUTION COMMUNICATION SYSTEM

(75) Inventors: Valentin Oprescu-Surcobe, Northbrook, IL (US); Michael F. Korus, Eden Prairie, MN (US); Donald G. Newberg, Hoffman Estates, IL (US); Aparna Pandey, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 430 days.

(21) Appl. No.: 12/982,208

(22) Filed: Dec. 30, 2010

(65) Prior Publication Data

US 2012/0170552 A1    Jul. 5, 2012

(51) Int. Cl.
| | |
|---|---|
| H04W 28/16 | (2009.01) |
| H04W 28/02 | (2009.01) |
| H04W 36/00 | (2009.01) |
| H04W 76/06 | (2009.01) |

(52) U.S. Cl.
CPC .............. *H04W 28/16* (2013.01); *H04W 28/02* (2013.01); *H04W 36/0011* (2013.01); *H04W 76/066* (2013.01)

(58) Field of Classification Search
CPC ..... H04W 80/04; H04W 36/18; H04W 36/30; H04W 36/36; H04W 28/16; H04W 76/066; H04W 36/0011; H04W 28/02
USPC ......... 370/241, 252, 310, 328, 329, 331, 332, 370/333; 455/403, 422.1, 436, 437, 438, 455/442
See application file for complete search history.

(56) References Cited

U.S. PATENT DOCUMENTS

| 5,946,612 A | 8/1999 | Johansson |
| 6,038,449 A | 3/2000 | Corriveau et al. |
| 6,400,951 B1 | 6/2002 | Vaara |

(Continued)

FOREIGN PATENT DOCUMENTS

| CN | 101242573 A | 8/2008 |
| CN | 100438654 C | 11/2008 |

(Continued)

OTHER PUBLICATIONS

"Universal Mobile Telecommunications System (UMTS): LTE; Multimedia Broadcast/Multicast Service (MBMS); Architecture and Functional Description (EGPP TS 23.246 Version 9.5.0.Release 9)", Technical Specification European Telecommunications Standards Institute (ETSI), France, Jun. 1, 2010; vol. 3GPP SA 2, No. V9.5.0; XP014047180.

(Continued)

*Primary Examiner* — Obaidul Huq
(74) *Attorney, Agent, or Firm* — Steven A. May

(57) ABSTRACT

Methods for managing resource utilization in a Long Term Evolution (LTE) communication system are described. In one method, an application server: receives signaling indicating resource utilization in the LTE system; determines, based on this signaling, a set of control parameters for a user equipment (UE) receiving service from the LTE system; and sends the set of control parameters to the UE, wherein the set of control parameters indicates behavior for the UE toward at least one of maintaining LTE system resources or modifying standard handover procedures. The signaling indicating resource utilization in the LTE system is sent from UE, the LTE system, or both.

2 Claims, 4 Drawing Sheets

(56) References Cited

U.S. PATENT DOCUMENTS

| | | | |
|---|---|---|---|
| 7,260,074 B2 | 8/2007 | Vare | |
| 7,929,970 B1 | 4/2011 | Gunasekara et al. | |
| 2003/0236827 A1 | 12/2003 | Patel et al. | |
| 2005/0107110 A1* | 5/2005 | Vasudevan et al. | 455/525 |
| 2005/0111430 A1* | 5/2005 | Spear et al. | 370/345 |
| 2005/0243721 A1* | 11/2005 | Cai et al. | 370/230 |
| 2005/0282571 A1 | 12/2005 | Oprescu-Surcobe et al. | |
| 2006/0025151 A1 | 2/2006 | Karaoguz et al. | |
| 2006/0252430 A1* | 11/2006 | Barreto et al. | 455/450 |
| 2006/0252439 A1* | 11/2006 | Cai | 455/515 |
| 2007/0207770 A1 | 9/2007 | Ikaheimo | |
| 2008/0218209 A1 | 9/2008 | Lee | |
| 2009/0133025 A1 | 5/2009 | Malhotra et al. | |
| 2009/0154408 A1 | 6/2009 | Jeong et al. | |
| 2009/0213800 A1 | 8/2009 | Lee et al. | |
| 2009/0318147 A1 | 12/2009 | Zhang et al. | |
| 2010/0135206 A1 | 6/2010 | Cherian et al. | |
| 2010/0190488 A1* | 7/2010 | Jung et al. | 455/424 |
| 2010/0216454 A1 | 8/2010 | Ishida Chie et al. | |
| 2010/0240375 A1 | 9/2010 | Ahluwalia | |
| 2010/0322069 A1 | 12/2010 | Song et al. | |
| 2011/0117916 A1 | 5/2011 | Dahlen | |
| 2011/0170496 A1* | 7/2011 | Fong et al. | 370/329 |
| 2011/0188446 A1 | 8/2011 | Bienas et al. | |
| 2011/0263255 A1* | 10/2011 | Alonso-Rubio et al. | 455/436 |
| 2011/0305184 A1* | 12/2011 | Hsu | 370/312 |
| 2012/0002643 A1 | 1/2012 | Chung et al. | |
| 2012/0064858 A1* | 3/2012 | Cai et al. | 455/406 |
| 2012/0082098 A1 | 4/2012 | Oprescu-Surcobe et al. | |
| 2012/0082105 A1* | 4/2012 | Hwang et al. | 370/329 |
| 2012/0170547 A1 | 7/2012 | Oprescu-Surcobe et al. | |
| 2012/0196543 A1* | 8/2012 | Andersson et al. | 455/67.11 |

FOREIGN PATENT DOCUMENTS

| | | |
|---|---|---|
| CN | 100466812 C | 3/2009 |
| EP | 1959617 A1 | 8/2008 |
| WO | 2005006829 A2 | 1/2005 |
| WO | 2008137354 A1 | 11/2008 |
| WO | 2009053933 A1 | 4/2009 |
| WO | 2009096833 A1 | 8/2009 |
| WO | 2010054391 A2 | 5/2010 |
| WO | 2011157216 A1 | 12/2011 |

OTHER PUBLICATIONS

"3rd Generation Partnership Project:Technical Specification Group Services and System Aspects: 3GPP Enablers for Open Mobile Alliance (OMA); Push-To-Talk Over Cellular (POC) Services; Stage 2, Release 9", Mobile Conference Centre, France, Dec. 11, 2009, pp. 1-38; XP050400718.
PCT International Search Report and Written Opinion for Application No. PCT/US2011/050483 dated Dec. 16, 2011.
PCT International Search Report and Written Opinion for Application No. PCT/US2011/067710 dated Apr. 16, 2012.
Nokia et al: "Enabling techniques for MBMS service continuity", 3GPP TSG-RAN WG 2 Meeting #58bis; R2-072415—Jun. 2007.
Motorola: MBMS Session Start and UE mobility between MBSFN and PTM, 3GPP TSG-RAN EG2#60; R2-074648—Nov. 2007.
Mediatek: "MBMS reception status report for service continuity",3GPP TSG-RAN2 #75 Meeting; R2-114197—Aug. 2011.
Mediatek: "MBMS SC in connected mode", 3GPP TSG-RAN2 #75 Meeting; R2-115220—Oct. 2011.
International Search Report in PCT Application No. PCT/US2011/067707 mailed May 7, 2012.
PCT International Search Report and Written Opinion for Application No. PCT/US2012/067692 dated Jun. 29, 2012.
International Preliminary Report on Patentability and Written Opinion for International Patent Application No. PCT/US2011/067710 issued Jul. 2, 2013.
Notice of Allowance mailed Feb. 6, 2012 in U.S. Appl. No. 12/981,923, Valentin Oprescu-Surcobe, filed Dec. 30, 2010.
Non-Final Office Action mailed Feb. 14, 2013 in U.S. Appl. No. 12/981,985, Valentin Oprescu-Surcobe, filed Dec. 30, 2010.
International Preliminary Report on Patentability and Written Opinion for International Patent Application No. PCT/US2011/067707 issued Jul. 2, 2013.
Notice of Allowance mailed Jun. 14, 2013 in U.S. Appl. No. 12/894,403, Valentin Oprescu-Surcobe, filed Sep. 30, 2010.
Non-Final Office Action mailed Dec. 7, 2012 in U.S. Appl. No. 12/894,403, Valentin Oprescu-Surcobe, filed Sep. 30, 2010.
International Preliminary Report on Patentability and Written Opinion for International Patent application No. PCT/US2011/050483 issued Apr. 2, 2013.
3GPP: "3GPP TS 25.331 v10.1.0 (Sep. 2010) 3rd Generation Partnership Project; technical Specification Group Radio Access Network; Radio Resource Control (RRC); Protocol Specification (Release 10)", Oct. 4, 2010, pp. 1, 2, 518-531, 1751-1758, XP002674615, Retrieved from the Internet URL: http://www.3gpp.org/ftp/Specs/html-info/25331.htm [retrieved on Apr. 24, 2012].
3rd Generation Partnership Project; Technical Specification Group Radio Access Network; Introduction of the Multimedia Broadcast/Multicast Service (MBMS) in the Radio Access Network (RAN); Stage 2 (Release 9)', 3GPP Standard; 3GPP TS 25.346, 3rd Generation Partnership Project (3GPP), Mobile Competence Centre; 650, Route Des Lucioles; F-06921, Sphia-Antipolis Cedex; France, No. V9.1.0, Apr. 27, 2010, pp. 1-73, XP050402610.
Final Office Action mailed Jul. 10, 2013, in U.S. Appl. No. 12/981,985, Valentin Oprescu-Surcobe et al., filed Dec. 30, 2010.
Notice of Allowance mailed Aug. 19, 2013 in U.S. Appl. No. 12/894,403, Valentin Oprescu-Surcobe et al., filed Sep. 30, 2010.
Patent Examination Report No. 1 mailed Apr. 10, 2014 in corresponding Australian Patent Application No. 2011307447.
Office Action mailed May 9, 2014 in corresponding European Patent Application No. 11 813 511.0.
Notice of Acceptance mailed Sep. 19, 2014 in corresponding Australian Patent Application No. 2011307447.
Office Action mailed Dec. 15, 2014 in corresponding European Patent Application No. 11 813 510.2.
Office Action mailed Dec. 15, 2014 in corresponding European Patent Application No. 11 755 531.8.

* cited by examiner

METHODS FOR MANAGING RESOURCE UTILIZATION IN A LONG TERM EVOLUTION COMMUNICATION SYSTEM

REFERENCE TO RELATED APPLICATIONS

The present application is related to the following U.S. applications commonly owned together with this application by Motorola, Inc.:

Ser. No. 12/981,923, filed Dec. 30, 2010, titled "Methods for Mobility Management of User Equipment in a Long Term Evolution System" by Oprescu, et al.; and Ser. No. 12/981,982, filed Dec. 30, 2010, titled "Method and System for Selecting a Target Cell for Handover of User Equipment in a Long Term Evolution System" by Oprescu, et al.

TECHNICAL FIELD

The technical field relates generally to communication systems and more particularly to managing resource utilization in a Long Term Evolution communication system.

BACKGROUND

Long Term Evolution (LTE) is the last step toward the $4^{th}$ generation (4G) of radio technologies designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and published by $3^{rd}$ Generation Partnership Project (3GPP), with the most recent version of the 3GPP TSs being published in March 2010 as a revised "Release 9" (with Release 10 currently being developed).

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplexing) and TDD (time-division duplexing) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®.

Most major carriers in the United States (US) and several worldwide carriers have announced plans to convert their networks to LTE beginning in 2009. In addition, public safety agencies in the US (including US Intelligence Services) have endorsed LTE as the preferred technology for the new 700 MHz public safety radio band. However, LTE systems do not currently provide some of the benefits of legacy systems for public safety applications.

For example, user equipment (UE) connected to an LTE communication system are faced with a choice between: shorter connection time (from the moment when a push-to-talk (PTT) button is keyed, for instance) at the expense of holding more resources; and keeping the resource consumption lower at the expense of higher connection times. LTE standard congestion control is generally based on a point-to-point call model appropriate for commercial use. However, the dropping policy for guaranteed bit rate bearers in case of congestion may not be suitable for public safety applications.

In addition, in general, the behavior of the UE is pre-programmed, which makes it more difficult for the UE to act differently in various locations or at different times, as the circumstances change.

Thus, there exists a need for methods for managing resource utilization in an LTE communication system, which address at least some of the shortcomings of past and present resource management techniques performed in LTE communication systems.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
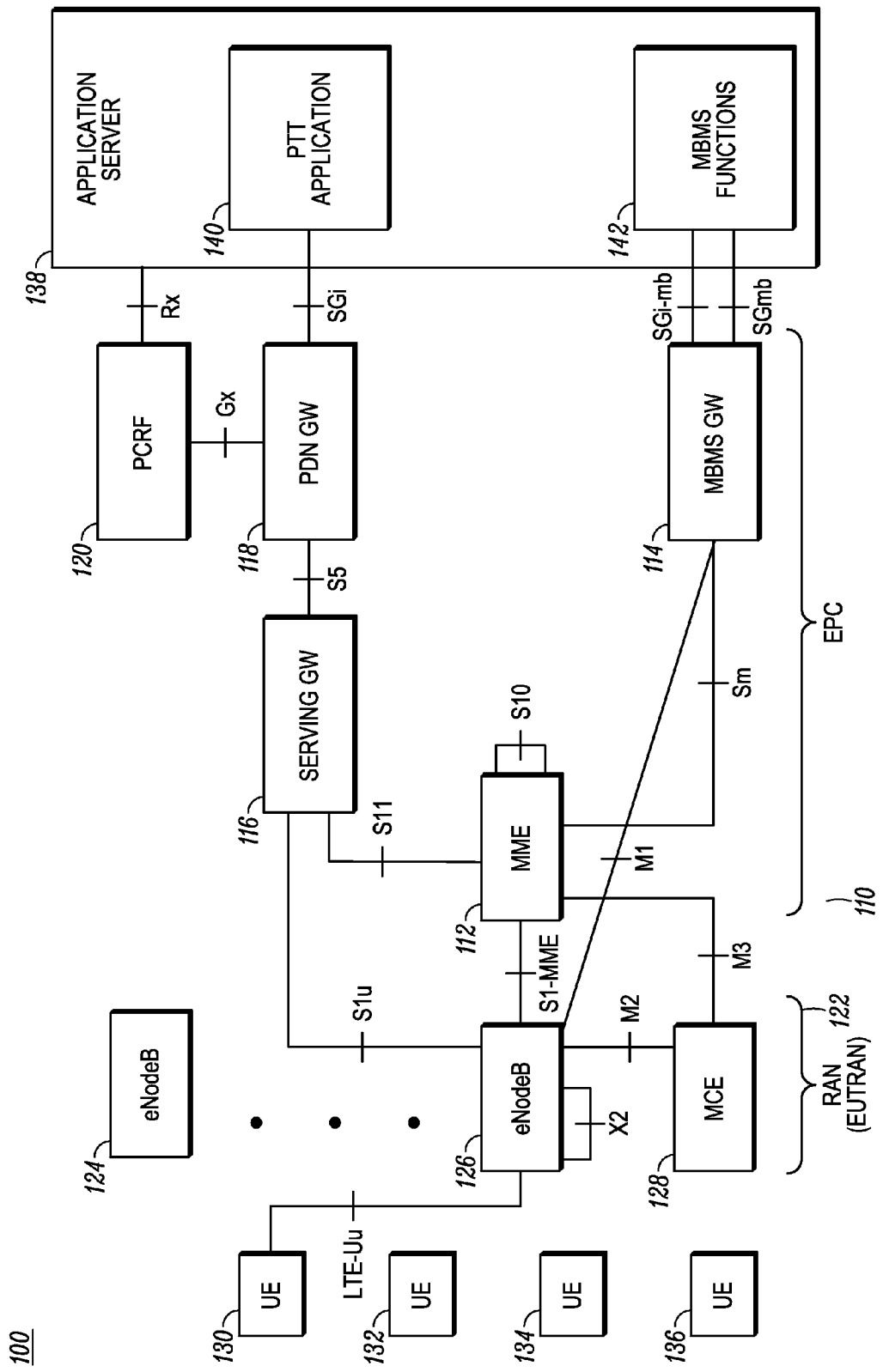
FIG. 1 is a system diagram of a communication system that implements methods for managing resource utilization in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, an application server: receives signaling indicating resource utilization in the LTE system; determines, based on this signaling, a set of control parameters for a UE receiving service from the LTE system; and sends the set of control parameters to the UE, wherein the set of control parameters indicates behavior for the UE toward maintaining LTE system resources and/or modifying standard handover procedures.

In accordance with another embodiment, a UE: receives a set of control parameters from an application server; and uses the set of control parameters to determine behavior of the UE toward maintaining LTE system resources and/or modifying standard handover procedures. One or more UE also sends, to the application server, the signaling that indicates resource utilization in the LTE system, wherein the signaling from the UE indicates at least one of: an identifier for an eNodeB and access probability factors broadcast by the eNodeB; the number and Quality of Service (QoS) of Evolved Packet System (EPS) bearers used by the UE for all of its applications and services; or utilization of Multimedia Broadcast Multimedia Services (MBMS) bearers shared with other UE.

In accordance with yet another embodiment: the LTE system: receives, from an application server, a request for signaling indicating resource utilization in the LTE system; receives, from the application server a set of reporting criteria; and provides, to the application server, the signaling indicating resource utilization in the LTE system, at a time and with a frequency that is controlled by the reporting criteria. The signaling provided, by the LTE system, to the application server indicates at least one of: a number of Evolved Packet System (EPS) bearer allocations: total reserved bandwidth; a total number of LTE connections; a number of ports available at gateways; an amount of memory available for buffering; a level of backhaul utilization; or an air interface congestion level.

Using the various teachings herein, advantages can be obtained, including but not limited to: providing a flexible mechanism for management of resource utilization and priority allocation, without the need to control the LTE communication system; being attractive to customers seeking dynamically configurable systems that provide very low call setup time while reducing the chances of access denial due to over-reservations of resources; significant handover-related signaling savings, essential for congestion situations; providing temporary differentiated priority based on rough location (explicit set of eNodeBs) of an incident, which is useful for public safety customers for example; providing differentiated behavior on a UE to UE basis, without the need for pre-programming the behaviors or setting them up one-by-one via dedicated communication. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system in accordance with some embodiments is shown and indicated generally at 100. System 100 includes system elements of: an LTE Evolved Packet Core (EPC) 110 having a number of logical elements (including a Mobility Management Entity (MME) 112, a Multimedia Broadcast Multicast Service Gateway (MBMS GW) 114, a Serving Gateway (SGW) 116, a Packet Data Network Gateway (PDN GW) 118, and a Policy and Charging Rules Function (PCRF) 120); an access network (in this case a radio access network (RAN)) 122 that includes a plurality of eNodeB (LTE base station) infrastructure devices 124 and 126 and a Multicast Control Entity (MCE) 128; a plurality of UE 130, 132, 134, and 136; and an application server (AS) 138 having logical entities of a Push-to-Talk application 140 and MBMS functions 142. In general, the EPC and the RAN are referred to collectively as the LTE system. The elements of communication system 100 and the interfaces between them are further described below.

In addition, the RAN 122 elements, EPC 110 elements, application server 138, and UE 130 to 136 implement protocols and signaling in accordance with LTE TSs; and the terms LTE communication system, LTE system, and Evolved Packet System (EPS) are used interchangeably herein and are each defined as being inclusive of the RAN 122 and the EPC 110 but not inclusive of the application server 138 or the UE. By contrast, the application server 138 is included in a network of a service provider for the UE, and communications between the application server 138 and the UE are facilitated using the LTE system. Moreover, only a limited number of EPC elements and UE, and one application server and RAN are shown in the diagram, but more such elements may be included in an actual commercial or private system implementation; and only one UE is shown connected to an eNodeB, and one eNodeB is shown connected to the EPC for ease of illustration. Also, the RAN can be any type of access network, including any 2G, e.g., Global System for Mobile Communication (GSM) or 3G, e.g., Universal Mobile Telecommunications System (UMTS), access network.

In general, the UE, the application server 138, the EPC 110 logical elements, and the RAN 122 elements are each implemented using (although not shown) a memory, one or more network interfaces, and a processing device that are operatively coupled, and which when programmed form the means for these system elements to implement their desired functionality, for example as illustrated by reference to the methods and corresponding system diagrams shown in FIG. 2 to FIG. 6. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the UE, the application server 138, the EPC 110 logical elements, and the RAN 122 elements may be programmed with software or firmware logic or code for performing functionality described by reference to FIG. 2 to FIG. 6; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the methods illustrated in FIGS. 2 to 6. The UE 130, 132, 134, and 136, which are also referred to in the art as subscribers, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users).

When a UE attaches to the LTE system, via the RAN, it is connected to the appropriate core network (i.e., MME, SGW, and PDN GW) based on an identity of a service provider sent by the UE. Mobility management for UE is classified based on the radio technologies of source and candidate (or target) LTE cells (with each cell defined as being inclusive of a single eNodeB's coverage area or a portion of an eNodeB's coverage area and can be identified by a cell identifier), and the mobility-state of the UE. Pursuant to this understanding of the relationship between cells and eNodeBs, within this text the terms "cell" and "eNodeB" may be used on occasion interchangeably, without loss of clarity. In addition, the abbreviation eNB may be used in lieu of eNodeB. From a mobility perspective, the UE can be in one of three states, DETACHED, IDLE, and ACTIVE. The DETACHED state is defined as a transitory state in which the UE is powered-on but is in the process of searching for and registering with the LTE system.

The ACTIVE state is defined as a state in which the UE is registered with the LTE system and has an RRC (radio resource control) connection with an eNodeB. Thus, a UE is deemed to have an "LTE connection" when the UE is in an ACTIVE state and has an RRC connection with an eNodeB, and when the UE to MME signaling connection has been established. In this ACTIVE state, the LTE system knows the cell to which the UE belongs and can transmit/receive data from the UE over bearer resources dedicated to the UE. Also, in the ACTIVE state, when a UE moves between two LTE cells, "backward" handover or predictive handover is carried out. In this type of handover, the source cell, based on radio frequency (RF) measurement reports from the UE, determines the target cell and queries the target cell if it has enough bearer resources to accommodate the UE. The target cell also prepares bearer resources before the source cell commands the UE to handover to the target cell. In an LTE system, it is the responsibility of the current (or serving) eNodeB to instruct the UE to send RF measurement reports and based on these reports, to prepare a target eNodeB to accept the UE, and finally to hand the UE over to the target eNodeB.

The IDLE state is defined as a power-conservation state for the UE, where the UE is not transmitting or receiving packets on a dedicated or default bearer but can receive MBMS service. In the IDLE state, no context about the UE is stored in the eNodeB, and the location of the UE is only known at the MME and only at the granularity of a tracking area (TA) that may include multiple eNodeBs. The MME knows the TA in which the UE last registered, and paging is necessary to locate the UE to a cell.

The application server 138 is an infrastructure device that supports applications (executed in a processing device) or provision of services to UE over the LTE system. Such applications include, but are not limited to, PTT services, PTV (Push-to-Video) services, PTX (push-to-anything) services via unicast or multicast. The multicast can be delivered through an EPS by way of unicast service or MBMS Service. In an embodiment, the application server 138 is an infrastructure element of a Public Land Mobile Network (PLMN) of a public safety agency to which the UE have access. As such, the application server may be, for instance, a computer aided dispatch (CAD) server, a media server, etc. As illustrated, the application server 138 includes the PTT application 140 and the MBMS functions 142. The PTT application 140 facilitates media delivery to the UE that have PTT capabilities. The MBMS functions 142, which are typically associated with a Broadcast-Multicast Service Center (BM-SC), manage MBMS services to the UE and are the source of MBMS traffic. The MBMS 148 functions include, for example, authorization for terminals requesting to activate a MBMS service, scheduling of broadcast and multicast services, integrity and confidentiality protection of MBMS data, MBMS session announcement, and serving as an entry point for content providers or any other broadcast/multicast source that is external to the LTE system. Moreover, although MBMS point-to-multipoint (PTM) functions 142 are illustratively shown, the application server 138 can, alternatively, be configured with any suitable PTM (e.g., broadcast and/or multicast) capabilities.

The EPC 110 is an all-IP core network that provides mobile core functionality that, in previous mobile generations (2G, 3G), has been realized through two separate sub-domains: circuit-switched (CS) for voice and packet-switched (PS) for data. The EPC 110 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 110 comprises the logical components of the MME 112, the MBMS GW 114, the SGW 116, the PDN GW 118, and the PCRF 120 and further comprises the, respective, interfaces (also referred to in the art as reference points) between these logical entities. The logical entities of the EPC 110 are shown as separate logical blocks and indeed can, in some embodiments, each be included in separate hardware devices or can, alternatively, be combined in one or more hardware devices. Also, the EPC 110, depending on the size of the network, may have several such components serving thousands or tens of thousands of UE and serving many application servers. Additional known elements and interfaces in an EPC as described in the 3GPP TSs for LTE that are needed for a commercial or private embodiment of the EPC 110 are not shown in FIG. 1 for the sake of clarity.

Turning first to the MME 112, this EPC element is the key control-node for UE access on the LTE system. It is responsible for IDLE mode UE tracking and paging procedures, including retransmissions. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown). Non-Access Stratum (NAS) signaling generated using a NAS protocol terminates at the MME 112, and the MME 112 is also responsible for generation and allocation of temporary identities or identifiers to UE. The MME 112 further checks the authorization of the UE to camp on the service provider's PLMN and enforces UE roaming restrictions.

In the control-plane, the NAS protocol, which runs between the MME 112 and the UE, is used for control-purposes such as network attach, authentication, setting up of bearers, and mobility management. Unlike in other systems, in LTE the allocation and maintenance of bearers is independent of the connection state of the UE, in the sense that a UE may be connected and not have bearers allocated to it and conversely, a UE may be idle but have allocated bearers.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic.

A bearer can be point-to-point (PTP) (such as a dedicated bearer or a default bearer), or a PTM bearer (such as a MBMS bearer) and has associated therewith a set of characteristics or attributes including, but not limited to, QoS, a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 114 is an entry point in the LTE system, and it distributes MBMS traffic to all eNodeBs within MBMS service areas. MBMS may use Single Frequency Network (SFN) transmission, also referred to as MBSFN. In MBSFN, the transmission happens from a time-synchronized set of eNodeBs using the same resource blocks. IP multicast can be used for distributing the traffic from the MBMS GW 114 to the different eNodeBs. The MCE 128 in the RAN 122 ensures that the same resource blocks are allocated for a given service across all the eNodeBs of a given MBSFN area. It is the task of the MCE 128 to ensure that RLC/MAC layers at the eNodeBs are appropriately configured for MBSFN operation.

The SGW 116 routes and forwards user point-to-point data packets, while also acting as the mobility anchor for the user plane during inter-eNodeB handovers and as the anchor for mobility between LTE and other 3GPP technologies. For IDLE state UE, the SGW terminates the downlink data path and triggers paging when downlink data arrives for the UE. It manages and stores UE contexts, e.g., the parameters of the bearer service and network internal routing information. It also performs replication of the user traffic in case of lawful interception.

The PDN GW 118 provides connectivity to the UE to external packet data networks by being the point of exit and entry of traffic for the UE. A UE may have simultaneous connectivity with more than one PDN GW for accessing multiple PDNs. The PDN GW 118 performs policy enforcement, packet filtering for each user, charging support, lawful interception and packet screening. Another key role of the PDN GW 118 is to act as the anchor for mobility between 3 GPP and non-3GPP technologies such as WiMAX and 3GPP2 (CDMA 1X and EvDO). The PCRF 120 supports SDF detection, policy enforcement and flow-based charging.

RAN 122 in this embodiment is a E-UTRAN (Evolved UMTS Terrestrial Radio Access Network) comprising multiple cells each served by an eNodeB, e.g., 124, 126, which serve as the intermediate infrastructure device between the UE and the EPC 110 and a point of access for the UE to allocated bearers. Each cell represents a geographic coverage area that provides the wireless resources termed herein as bearers for carrying data (or SDFs) for UE connected to the RAN. An RRC layer in the eNodeB makes handover decisions based on neighbor cell measurements sent by the UE, pages for the UE over the air, broadcasts system information, controls UE RF measurement reporting such as the periodicity of Channel Quality Information (CQI) reports, and allocates cell-level temporary identifiers to active UE. The RRC layer also executes transfer of UE context from the source eNodeB to the target eNodeB during handover, and does integrity protection of RRC messages. In addition, the RRC layer is responsible for the setting up and maintenance of EPS bearer resources.

Regarding the LTE reference points, the UE communicates its signaling with an eNodeB via an LTE-Uu reference point. An S1-MME reference point is used for the control plane protocol (e.g., eRANAP which uses Stream Control Transmission Protocol (SCTP) as the transport protocol) between the E-UTRAN (e.g., via the eNodeB 126) and the MME 112. An S1u reference point between the eNodeB 126 (E-UTRAN) and the SGW 116 is used for the per-bearer user plane tunneling and inter-eNodeB path switching during handover, wherein the transport protocol over this interface is GPRS Tunneling Protocol-User plane (GTP-U). An X2 reference point is used for inter-eNodeB communications.

An S5 reference point provides user plane tunneling and tunnel management between the SGW 116 and the PDN GW 118 and is used for SGW relocation due to UE mobility and if the SGW needs to connect to a non-collocated PDN GW for the required PDN connectivity. Both GTP and IETF (Internet Engineering Task Force) based Mobile IP protocols are used over this interface.

A Gx reference point provides transfer of QoS policy and charging rules from the PCRF 120 to a Policy and Charging Enforcement Function (PCEF, not shown) in the PDN GW 118. An Rx reference point resides between the PCRF 120 and an Application Function (AF, not shown) in the application server 138. An S10 reference point resides between MMEs for MME relocation and MME to MME information transfer. An S11 reference point resides between the MME 112 and SGW 116 for corresponding signaling.

An SGi reference point resides between the PDN GW 118 and a packet data network (in this case a PDN that includes the application server 138), such as an operator-external public or private PDN or an intra-operator PDN, e.g., for provision of IMS services. The SGi reference point corresponds to a Gi reference point for 2G/3G accesses.

For supporting the PTM signaling provided by MBMS (in this illustrative embodiment), an SG-mb reference point between the MBMS GW 114 and the application server 138 supports MBMS bearer signaling for setting up and releasing context at MBMS session establishment and termination and also may support user related signaling, e.g. for Multicast session authorization, or user session joining or detach. An SGi-mb reference point between the MBMS GW 114 and the application server 138 supports the MBMS traffic plane. An M1 reference point between the MBMS GW 114 and the eNodeB 126 makes use of IP multicast protocol for the delivery of packets to eNodeBs, via the SYNC protocol. An M2 reference point between the eNodeB 126 and the MCE 128 is used by the MCE 128 to provide the eNodeB with radio configuration data. An M3 reference point between the MME 112 and the MCE 128 supports the MBMS session control signaling, e.g. for session initiation and termination. An Sm reference point provides for communications between the MBMS GW 114 and the MME 112 to support the PTM services.

A PTM bearer is generally associated with a service and is identified via a Temporary Mobile Group Identity (TMGI). Between the eNodeB and the UE, the PTM bearer takes the form of a Multicast Traffic Channel (MTCH), with the traffic associated to a specific TMGI being carried by specific a MTCH at any given time. Within a MBSFN area, several MTCHs being transmitted with the same modulation and coding levels can be grouped in one MCH transport channel. Common signaling is carried out at both the RRC layer (e.g. the MCCH control channel) and at the MAC layer.

Figure 2:
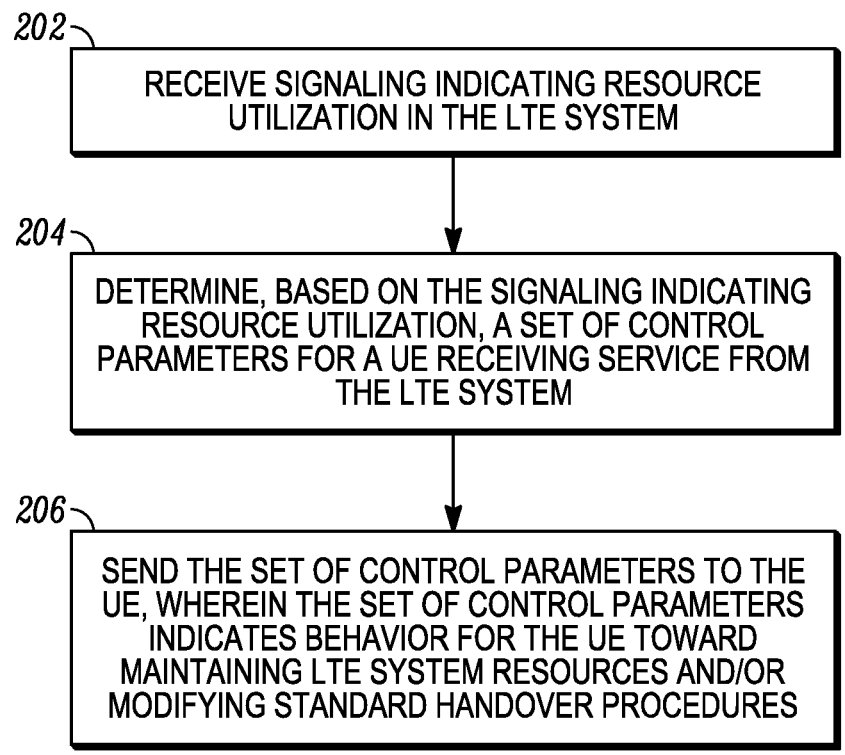
FIG. 2 is a flow diagram illustrating a method at an application server for managing resource utilization in accordance with some embodiments.

Turning now to FIG. 2, a flow diagram illustrating a method for managing resource utilization is shown and generally indicated at 200. The functionality illustrated by method 200 is performed in an application server such as the application server 138. In accordance with method 200, the application server receives (202) signaling indicating resource utilization in the LTE system, wherein resource utilization means usage and/or availability of LTE connections and/or EPS bearers in the LTE system. The indication of resource utilization is received from the UE, one or more of the elements in the EPS or both.

In an illustrative embodiment, to facilitate the tracking of the usage and availability of LTE resources and EPS bearers in the LTE system, the application server 138, in general: discovers, even prior to the start of operations, the limits of the LTE system capacity in terms of the LTE connections and EPS bearers so that appropriate thresholds can be established; activates, deactivates, and modifies resource utilization reporting from the UE and the LTE system during normal operations; and receives metrics (i.e., the indications of resource utilization in the LTE system) as reported by the UE and the LTE system, wherein the application server can infer congestion in the LTE network and, accordingly, send parameters to modify UE behavior (and thereby effectively manage LTE system resources) based on the current conditions in the LTE system.

For example, the application server can command or direct one or more UE to report, periodically, on demand, and/or when thresholds are exceeded, various factors or parameters that indicate utilization of LTE system resources. This is different from the prior art, in which a UE reports to the LTE system (and not to an application server) instantaneous RF conditions on a communication path that only the UE is currently using, such as the signal-to-noise or signal-to-interference ratios (SNR and SIR) on a single communication path at a given point in time. Instead, in accordance with the teachings herein, the UE is reporting to an application server a level of resource utilization of the LTE system itself above and beyond just the UE instantaneous utilization of system resources.

The factors reported by the UE can include, for example, an identifier (ID) of an eNodeB and access probability factors broadcast by the eNodeB, as well as factors that are specific to the UE, such as the number and QoS of EPS bearers used by the UE for all services and applications used by or running on the UE, including PTT services (illustrated) and non-PTT services. The access probability factors can include, but are not limited to, access barring factors and access barring times. If configured for this functionality, a UE, in a further implementation scenario, gathers and reports to the application server 138 the utilization of shared resources, such as a shared downlink PTM bearer. In one illustrative implementation, a UE reports to the application server 138 utilization of MBMS bearers shared with the UE. Such reporting can include, for instance, an amount of MBMS dynamic scheduling information, downlink grants and connected state "paging" (for other UE) on dedicated channels, and downlink HARQ (Hybrid Automatic Repeat Request) error activity during a measurement period.

It should be realized that these are illustrative factors that a UE can report to the application server 138 to indicate resource utilization in the LTE system, and that other such factors are within the scope of the teachings herein. In addition, UE can report such factors for one or more eNodeB. For instance, if a UE reports this information within a short time interval (e.g., based on some threshold value) following a handover or following the selection of a new eNodeB while the UE was in idle state, the UE reports the resource utilization information for both the current and the prior eNodeBs.

Moreover, any suitable signaling (e.g., proprietary messages or fields within packets, datagrams, etc., already being communicated between the UE and the application server 138 such as floor control signaling) and timing of the signaling can be used by the UE to report the LTE system resource utilization information to the application server 138, with a design to minimize the LTE system resources used for such reporting. For example: only some UE (e.g., 1-2 per eNodeB) provide the reports; the typical granularity of the report can be about 1 every 10-30 s, since these reports are used to manage the resource utilization by all of the UE for the duration of the next 1-2 talk spurts; and only UE that already have an allocated uplink channel send reports, to prevent the report from causing a request for resources and actually contributing to congestion in the LTE system. In an additional implementation, the parameters, the timing of the reporting of the parameters, and the UE reporting the parameters are dynamically changed, for example by a system operator or administrator such as a dispatcher, to handle specific incidents and UE priority levels.

The application server 138, upon obtaining eNodeB IDs (e.g. from the UE being served), can request that any one or more of these eNodeBs report in any suitable signaling (e.g., proprietary messages or fields within packets, datagrams, etc.,) the indication of resource utilization in the LTE system. As with the UE, such information can be reported periodically, on demand, and/or when thresholds are exceeded to minimize additional traffic and congestion in the LTE system caused by the reporting. For example, the resource utilization reporting can be performed by the eNB or the MME within the LTE system and might be piggy-backed on other signaling from the LTE system. In addition, a system operator (e.g., the dispatcher) can dynamically change the parameters, the timing of the reporting of the parameters, and the eNodeB reporting the parameters to handle specific incidents and UE priority levels.

In one illustrative example, one or more eNodeB can report the following parameters to the application server 138 in any suitable combination as directed by the application server or provisioned into the eNodeB to indicate LTE system resource utilization: a number of EPS bearer allocations; total reserved bandwidth; a total number of LTE connections; a number of ports available at gateways; an amount of memory available for buffering; a level of backhaul utilization; or an air interface congestion level. These examples are not meant to be inclusive of all possible factors that can be used to indicate LTE system utilization, and others are within the scope of the teachings herein.

Returning again to the description of method 200 of FIG. 2, at 204, the application server 138 determines, based on the signaling indicating resource utilization, a set of control parameters for one or more UE receiving service from the LTE system. In setting these parameters, thresholds are defined, in one embodiment, to enable the application server 138 to determine the number of UE to keep in connected mode and the number of UE to direct or command to idle mode for managing resource utilization in the LTE system.

Once thresholds are determined, any suitable algorithm can be used to control the ratio of connected UE (i.e., UE in an ACTIVE state) to UE in IDLE mode or state. In one illustrative implementation, thresholds are defined for the number of allocated EPS bearers (e.g., >75 HIGH (H), 40-75 MEDIUM (M), <40 LOW (L)) and for access probability factors (e.g., >90% HIGH (H), 60-90% MEDIUM (M), <60% LOW (L)). In accordance with an illustrative algorithm, if the variables of EPS bearers and access probability factors have a LH combination then all the UE already in connected mode should remain in connected mode; if the variables have a MM combination, then UE in connected mode should be allowed to move to idle state, while keeping their allocated bearers; if the variables have a HL combination, then move all UE to idle mode, while releasing their allocated bearers. Different or more complex algorithms can be used to determine the ratio of connected-to-idle UE.

Upon determining this ratio, the application server 138 determines the control parameters for the UE to control the UE behavior with respect to handover behavior and maintaining LTE system resources and, thereby, manage utilization of the LTE system resources in accordance with the determined ratio of connected-to-idle UE. Example control parameters include, but are not limited to any combination of: a resources request and release (RRR) descriptor that indicates to the UE timing information of when, for how long or how frequently to perform at least one of request an LTE connection, hold an LTE connection (e.g. by sending a "heart-beat" to the serving cell), request or release an EPS bearer; establish (or not) dedicated signaling bearers to the application server or use GBR voice bearers for floor control requests; establish dedicated GBR bearers prior to floor grant; a time hold (TH) parameter that indicates when and for how long the UE signals the LTE system in order to hold an LTE connection; a modifier for handover behavior (Modify HO) that causes the UE to modify its standard handover behavior while the UE is connected to the LTE system; a list of acceptable eNodeB's (eNB list) for servicing the UE; or a filtering parameter (e.g., UE filter tag, override value) that indicates particular UE to which the set of control parameters applies. A system operator can change these parameters dynamically, to handle specific incidents in specific locations on an ad hoc basis, for instance to give higher priority to some responders, e.g., firemen inside a building verses other responders, e.g., firemen traveling to the place of the incident.

Figure 3:
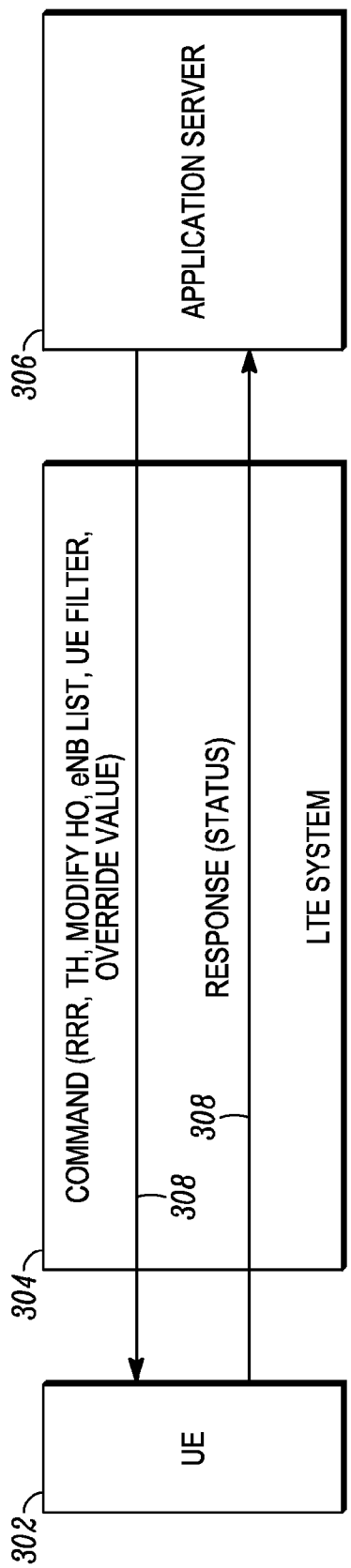
FIG. 3 is a system diagram illustrating control parameters sent to a UE over a dedicated bearer to enable the managing of resource utilization in accordance with some embodiments.
Figure 4:
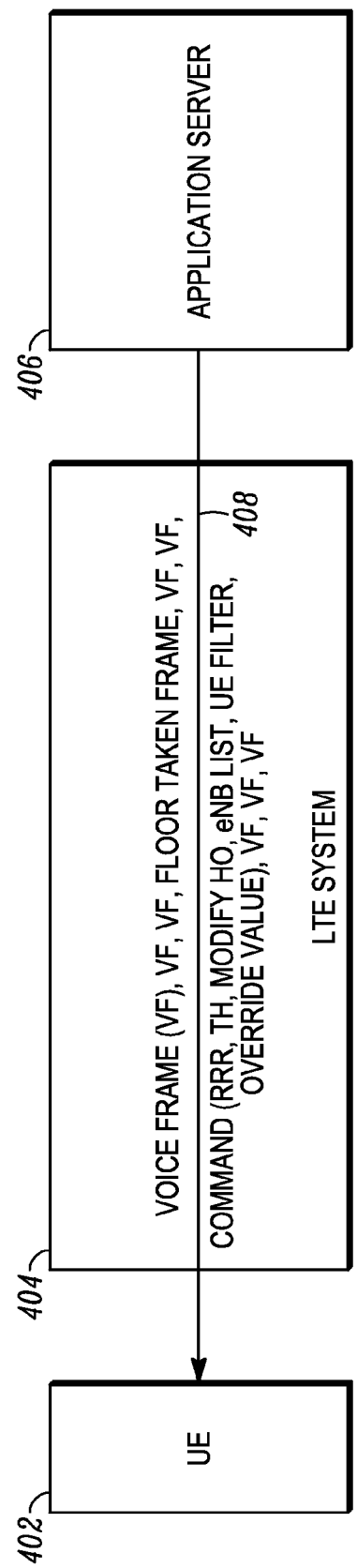
FIG. 4 is a system diagram illustrating control parameters sent to a UE over a common downlink bearer to enable the managing of resource utilization in accordance with some embodiments.

The application server 138 uses any suitable EPS bearer to send (206) the set of control parameters to the UE. For instance, FIG. 3 illustrates an application server 306 sending a command (signaling) having control parameters to a UE 302 via an LTE system 304 using a bidirectional EPS bearer 308 on the downlink to that specific UE, with the UE 302 sending a status response, e.g. to report some resource utilization back to the application server 306 on the uplink of the same bidirectional bearer. In another illustrative implementation, as shown by reference to FIG. 4, an application server 406 sends a command (signaling) having control parameters to a UE 402 via an LTE system 404 using a downlink PTM (e.g., MBMS) bearer, wherein the filtering parameters are used to communicate which parameters apply to which UE. The control parameters could be sent on the same bearer with user traffic such as voice frames (VF) and floor control signaling (e.g., a Floor Taken frame) and include the information elements mentioned above, e.g., the RRR, TH, Modify HO, eNB list, UE filter tag, and override value parameters, which are next described in some additional detail.

Figure 5:
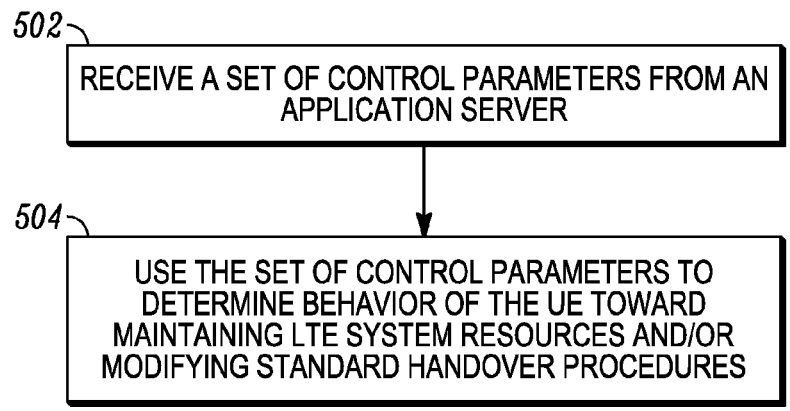
FIG. 5 is a flow diagram illustrating a method for managing and reporting resource utilization by a UE in accordance with some embodiments.

As shown in FIG. 5, upon receiving (502) the control parameters from the application server, the UE uses (504) the set of control parameters to determine its behavior toward maintaining (meaning requesting, releasing, and/or holding) LTE system resources and/or modifying standard handover procedures, wherein standard handover procedures are defined as handover procedures that are performed in accordance with and as described in LTE technical specifications (TS).

With further regards to the control parameters, using the RRR descriptor, the application server can command one or more UE regarding whether to perform some combination of: access (or not) the eNodeBs while the floor (i.e., the right to transmit) belongs to someone else; establish (or not) dedicated EPS bearers to the application server or use GBR voice bearers for floor control requests; establish dedicated GBR bearers prior to floor grant; hold for specified amounts of time (controlled by the time hold parameters) the GBR voice bearers following a floor grant reject or the end of a talk spurt; apply the command only to UE that do (or do not) match the UE filter tag value; or apply the command only if the new override value exceeds the value of the override value for the command currently in effect. Accordingly, the application server can use the RRR descriptor to control UE behavior regarding holding or releasing bearers based on which eNodeBs within a Single Frequency Network (SFN) area access comes from (and can, thereby give priority to certain incidents over others, when they occur at different locations). The application server can also implement de facto queuing users at eNodeBs, using the RRR descriptor, by giving some users the right to hold more resources (and thereby have a better chance of obtaining the floor than others).

Action taken by the UE based on the Modify HO parameter apply while the UE is LTE/RRC connected. In this state, the UE awaits (for instance 10 s) either for a user to press the PTT again or for the eNodeB to send an explicit connection release. The alternatives given below avoid the situation, caused by standard handover procedures, of the UE moving to a new eNodeB and restarting the 10 s wait period while waiting to be released due to inactivity. Based on the received Modify HO parameter in accordance with the teachings herein, the UE withholds measuring signals received from eNodeBs or withholds sending an RF measurement report (for a weak signal) to the serving eNodeB; thus, it will not trigger a handover command from the eNodeB. The UE may subsequently go idle. At that time, the UE performs a selection to a new (stronger signal) eNodeB or cell. This saves signaling in the network and over the air.

Alternatively, the UE sends the normal RF measurement report to the serving eNodeB, which will trigger the handover related signaling in the network. However, upon receiving the handover command from the eNodeB, the UE ignores it, unless the user has pressed the PTT button or the signaling on the downlink MBMS bearer indicates that the floor has been released (which makes it more likely that the user may push the PTT button imminently). This saves less handover related signaling than in the previous case, but gives the user more time to regain the floor.

Regarding the filtering parameters, the UE filter tag limits applicability, to the receiving UE, of the set of control parameters based on whether the UE possesses a tag that matches the filter tag, thereby, allowing different commands for different classed of UE. The override value allows selective control over specific UE, for instance, when the communication occurs on a common PTM downlink bearer. In one illustrative implementation, a current override value limits applicability, to the receiving UE, of the set of control parameters based on whether the UE previously applied a set of control parameters having an associated override value that is less than the current override value.

Figure 6:
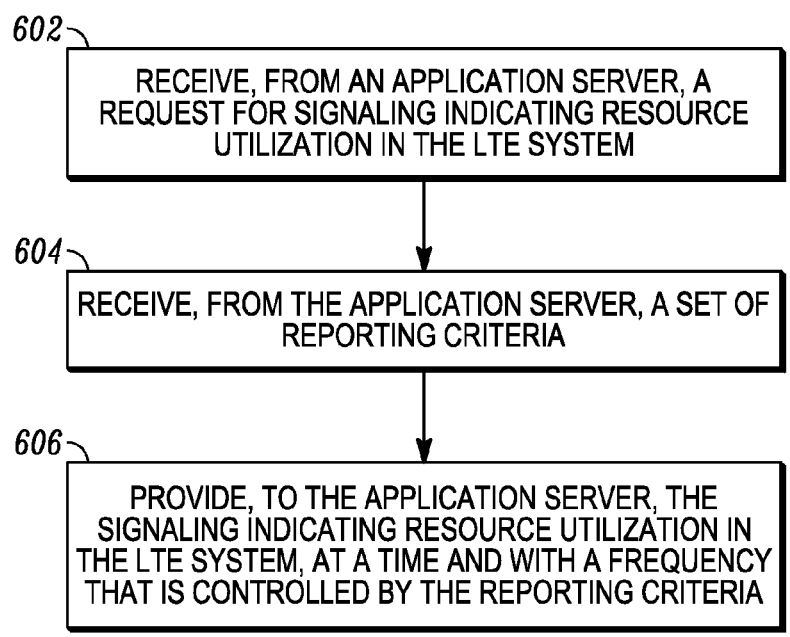
FIG. 6 is a flow diagram illustrating a method for managing and reporting resource utilization by an LTE system in accordance with some embodiments.

Turning now to FIG. 6, illustrated is a flow diagram illustrating a method 600 for managing and reporting resource utilization in accordance with some embodiments. Method 600 is performed by one or more elements in the LTE system.

At 602, the LTE system receives from the application server a request for signaling indicating resource utilization in the LTE system, and also receives (604) from the application server a set of reporting criteria. This can be done using any suitable registration process, whereby the application server registers interest in receiving reports and indicates reporting factors and thresholds, with respect to acceptable congestion levels at eNodeBs, MME, SGW and PDN GW. Those EPS elements report (606) resource utilization to the application server at a time and with a frequency (e.g., periodically, on demand, and/or when thresholds are exceeded) as controlled by the reporting criteria. Examples of reported information are earlier described and can be included in the reporting criteria and/or provisioned in the EPS nodes. In addition, during operation, the application server can modify reporting criteria or cancel reporting from some or all EPS elements depending on changing conditions in the network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for managing resource utilization in a LTE communication system described herein. The non-processor circuits may include, but are not limited to, a radio receiver, a radio transmitter, signal drivers, clock circuits, power source circuits, and user input devices. As such, these functions may be interpreted as steps of a method to perform managing resource utilization in a LTE communication system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing resource utilization in a Long Term Evolution (LTE) communication system, the method comprising:
   conveying, to an LTE core network by an application server, a request for signaling indicating resource utilization in the LTE system;
   conveying, to the LTE core network by the application server, a set of reporting criteria, wherein the reporting criteria command a provision of the signaling indicating resource utilization one or more of periodically, on demand, and when thresholds are exceeded;

receiving, by the application server from the LTE core network, the signaling indicating resource utilization in the LTE system, at a time and with a frequency that is controlled by the reporting criteria.

2. The method of claim 1, wherein the signaling provided to the application server indicates at least one of:
a number of Evolved Packet System (EPS) bearer allocations;
total reserved bandwidth;
a total number of LTE connections;
a number of ports available at gateways;
an amount of memory available for buffering;
a level of backhaul utilization; or
an air interface congestion level.

* * * * *